(12) United States Patent
Watanabe et al.

(10) Patent No.: US 6,396,491 B2
(45) Date of Patent: May 28, 2002

(54) METHOD AND APPARATUS FOR REPRODUCING A SHAPE AND A PATTERN IN A THREE-DIMENSIONAL SCENE

(75) Inventors: Masaki Watanabe; Shuichi Shiitani, both of Kawasaki; Masaaki Oota, Kanazawa; Susumu Endo; Hiroaki Harada, both of Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/781,328

(22) Filed: Feb. 13, 2001

Related U.S. Application Data

(63) Continuation of application No. PCT/JP99/03437, filed on Jun. 25, 1999.

(30) Foreign Application Priority Data

Aug. 20, 1998 (JP) .......................................... 10-234759

(51) Int. Cl.⁷ .............................................. G06T 17/00
(52) U.S. Cl. ....................................................... 345/419
(58) Field of Search ................................. 345/418, 419, 345/420, 421, 422, 425, 426, 427, 428

(56) References Cited

U.S. PATENT DOCUMENTS

| | | | |
|---|---|---|---|
| 5,727,093 A | | 3/1998 | Uchiyama et al. |
| 6,256,036 B1 | * | 7/2001 | Matsumoto ................. 345/419 |
| 6,304,263 B1 | * | 10/2001 | Chiabrera et al. .......... 345/419 |
| 6,331,851 B1 | * | 12/2001 | Suzuki et al. ............... 345/419 |
| 6,342,887 B1 | * | 1/2002 | Munroe ....................... 345/419 |

FOREIGN PATENT DOCUMENTS

| | | |
|---|---|---|
| JP | 9-69170 | 3/1997 |
| JP | 9-97344 | 4/1997 |
| JP | 9-147147 | 6/1997 |

OTHER PUBLICATIONS

Watanabe, Masaki et al., "User Supporting Function of Sketch Vision, CG Modeling Tool Based on Video–Images in Graphics and CAD Symposium", Fujitsu Laboratories Ltd., Oct. 1995.

Hotoge, Keiichi et al., "System Applied VRML Technology" in Fujitsu, Mar. 1997.

"Nikkei Computer Graphics", Mar. 1997.

"Latest CG Software Purchase Guide '97 to '98", Oct. 1997.

* cited by examiner

*Primary Examiner*—Cliff N. Vo
(74) *Attorney, Agent, or Firm*—Staas & Halsey LLP

(57) ABSTRACT

A method and apparatus for reproducing a shape and a pattern in a three-dimensional scene with good precision, based on a plurality of images, by realizing processing that considers a three-dimensional model from the beginning of the processing. A plurality of images are captured, a plurality of frames to which processing is applied are selected from the captured images, correspondence between a plurality of images are extracted, a three-dimensional model to be a base is input, a three-dimensional model that defines geometric properties in a target object in the images is selected, correspondence between the images and the three-dimensional model is specified, the three-dimensional model is deformed while satisfying both the correspondence between the images and the correspondence between the images and the three-dimensional model, a pattern image to be attached to a surface is generated based on a shape of the three-dimensional model and the correspondence between the three-dimensional model and the images, and the final three-dimensional model is output.

17 Claims, 12 Drawing Sheets

METHOD AND APPARATUS FOR REPRODUCING A SHAPE AND A PATTERN IN A THREE-DIMENSIONAL SCENE

This application is a continuing application, filed under 35 U.S.C. §111(a), of International Application PCT/JP99/03437, filed Jun. 25, 1999, it being further noted that priority is based upon Japanese Patent Application 10-234759, filed Aug. 20, 1998.

TECHNICAL FIELD

The present invention relates to processing for reproducing a partial or entire three-dimensional scene, in which a plurality of digitized videos or animation appear, into a three-dimensional shape, and converting the three-dimensional shape into a three-dimensional model to be displayed in computer graphics.

BACKGROUND ART

In order to reproduce a three-dimensional shape by using a three-dimensional scene that is a two-dimensional image, in which a three-dimensional object such as a plurality of videos or animation appears, it is required to appropriately grasp the correspondence between a plurality of videos or between a plurality of frames (hereinafter, referred to as "between images").

FIG. 1 shows a flow chart of processing in a conventional method for reproducing a shape and a pattern in a three-dimensional scene. In FIG. 1, when two-dimensional data such as a plurality of videos or animation to be reproduced is given (Operation 101), the correspondence between images is investigated (Operation 102). According to a conventional method, obtaining the consistency of vertexes at coordinate positions of a three-dimensional shape is the mainstream; however, at this point, the consistency or the like of each plane or side, in particular, a pattern or an arbitrary point in each plane is not taken into consideration.

Only a three-dimensional shape is reproduced based on the correspondence between vertexes (Operation 103). Herein, a three-dimensional shape is reproduced only by using vertexes in accordance with triangulation or the like, and sides or planes are not present. Then, a geometric model is applied (Operation 104), whereby a three-dimensional model having planes, sides, or the like is reproduced. Finally, texture is attached to each plane of the three-dimensional model to reproduce a pattern (Operation 105), whereby reproduction of the three-dimensional shape is completed. The reproduced three-dimensional model is output in accordance with a data format of computer graphics to be used (Operation 106), whereby the three-dimensional model can be used as a vector value.

In order to enhance the precision of reproduction of a three-dimensional shape in investigation of the correspondence between images and reproduction of a three-dimensional shape, an appropriate model has been conventionally utilized often. For example, JP 9 (1997)-69170 A discloses a method for generating a three-dimensional model, in particular, by applying a plane model containing texture pattern information to a three-dimensional shape, and attaching the plane model to each surface of a three-dimensional model, so as to reproduce a three-dimensional shape.

However, according to the above-mentioned method, a depth and the like in a three-dimensional model are not taken into consideration when texture model pattern information to be modeled as a plane model is obtained. This causes a shift between the depth and the pattern image, resulting in an unnatural three-dimensional model. Further, in the case where an error is caused in obtaining a three-dimensional shape, a portion, which can be approximated merely by being attached to a three-dimensional model as a plane model, is also excluded as inappropriate texture pattern information, so that such a portion will not be attached to a three-dimensional model.

DISCLOSURE OF INVENTION

The present invention overcomes the above-mentioned problem, and its object is to provide a method and apparatus for realizing processing in which a three-dimensional model is considered from the beginning of the processing in reproduction of a shape and a pattern in a three-dimensional scene based on a plurality of images, and reproducing the shape and the pattern with good precision.

In order to solve the above-mentioned problem, the method for reproducing a shape and a pattern in a three-dimensional scene of the present invention is a method for reproducing a shape and a pattern in a three-dimensional scene forming a three-dimensional model used for computer graphics based on a plurality of images, including: capturing the plurality of images, storing the captured images, selecting a plurality of frames to which processing is applied from the stored images, and extracting correspondence between the plurality of images; inputting the three-dimensional model to be a base, storing the input three-dimensional model, selecting the three-dimensional model that defines geometric properties of a target object in the images, and specifying correspondence between the images and the three-dimensional model; deforming the three-dimensional model while satisfying both the obtained correspondence between the images and the obtained correspondence between the images and the three-dimensional model; generating a pattern image to be attached to a surface of the three-dimensional model, based on a shape of the final three-dimensional model obtained by the deforming, and the specified correspondence between the final three-dimensional model and the images; and outputting the completed final three-dimensional model.

According to the above-mentioned structure, the shape of a three-dimensional model can be determined while the correspondence in a pattern is being considered, whereby a shape or the like in a three-dimensional scene can be reproduced as a completed natural three-dimensional model in which a pattern shift or the like does not occur.

Further, in the method for reproducing a shape and a pattern in a three-dimensional scene of the present invention, it is desirable that, in the extracting of the correspondence between the plurality of images, a user can specify the correspondence. The reason for this is that a user can freely add even correspondence which cannot be detected or is unlikely to be detected by a system, whereby a three-dimensional model closer to a real one can be reproduced.

Further, in the method for reproducing a shape and a pattern in a three-dimensional scene of the present invention, it is preferable that, in the extracting of the correspondence between the plurality of images, the correspondence between the plurality of images is determined based on brightness of the images and information obtained by processing the brightness. This is because merely extracting correspondence as a pattern cannot support a change in an image caused by the difference in exposure of a photograph or the like, the strength of a light source, and the like.

Next, in order to solve the above-mentioned problem, the method for reproducing a shape and a pattern in a three-dimensional scene of the present invention is a method for reproducing a shape and a pattern in a three-dimensional scene forming a three-dimensional model used for computer graphics based on a plurality of images, including: capturing the plurality of images, storing the captured images, and selecting a plurality of frames to which processing is applied from the stored images; inputting the three-dimensional model to be a base, storing the input three-dimensional model, selecting the three-dimensional model that defines geometric properties of a target object in the images, and specifying correspondence between the images and the three-dimensional model; deforming the three-dimensional model while investigating portions, between the images, which satisfy the obtained correspondence between the images and the three-dimensional model; generating a pattern image to be attached to a surface of the three-dimensional model, based on a shape of the final three-dimensional model obtained by the deforming, and the specified correspondence between the final three-dimensional model and the images; and outputting the completed final three-dimensional model.

According to the above-mentioned structure, the shape of a three-dimensional model can be determined while the correspondence in a pattern is being considered, whereby a shape or the like in a three-dimensional scene can be reproduced as a completed natural three-dimensional model in which a pattern shift or the like does not occur.

Further, in the method for reproducing a shape and a pattern of the present invention, it is desirable that, in the deforming of the three-dimensional model and in the generating of a pattern image to a surface of the three-dimensional model, a user can specify a partial change in geometric properties of the three-dimensional model. The reason for this is that a three-dimensional scene is reproduced as a three-dimensional model closer to a real one by finely adjusting application of a three-dimensional model.

Further, in the method for reproducing a shape and a pattern in a three-dimensional scene of the present invention, it is preferable that, in the deforming of the three-dimensional model and in the generating of a pattern image to a surface of the three-dimensional model, the three-dimensional model can be replaced. This is because a reproduction precision can be enhanced by providing a chance to use a more appropriate three-dimensional model.

Next, in order to solve the above-mentioned problem, the apparatus for reproducing a shape and a pattern in a three-dimensional scene of the present invention is an apparatus for reproducing a shape and a pattern in a three-dimensional scene forming a three-dimensional model used for computer graphics based on a plurality of images, including: an image input part for capturing the plurality of images; an image storing part for storing the images captured from the image input part; an image selecting part for selecting a plurality of frames to which processing is applied from the images stored in the image storing part; an inter-image correspondence obtaining part for extracting correspondence between the plurality of images; a three-dimensional model input part for inputting the three-dimensional model to be a base; a three-dimensional model storing part for storing the three-dimensional model input from the three-dimensional mode input part; a three-dimensional model selecting part for selecting the three-dimensional model that defines geometric properties of a target object in the images; an image—three-dimensional model correspondence obtaining part for specifying correspondence between the images and the three-dimensional model; a three-dimensional information reproducing part for deforming the three-dimensional model while satisfying both the correspondence between the images obtained in the inter-image correspondence obtaining part and the correspondence between the images and the three-dimensional model obtained in the image—three-dimensional model correspondence obtaining part; a pattern image generating part for generating a pattern image to be attached to a surface of the three-dimensional model, based on a shape of the final three-dimensional model obtained in the three-dimensional information reproducing part, and the specified correspondence between the final three-dimensional model and the images; and a generated model output part for outputting the completed final three-dimensional model.

According to the above-mentioned structure, the shape of a three-dimensional model can be determined while the correspondence in a pattern is being considered, whereby a shape or the like in a three-dimensional scene can be reproduced as a completed natural three-dimensional model in which a pattern shift or the like does not occur.

Further, in the apparatus for reproducing a shape and a pattern in a three-dimensional scene of the present invention, it is desirable that, in the inter-image correspondence obtaining part, a user can specify the correspondence. The reason for this is that a user can freely add even correspondence which cannot be detected or is unlikely to be detected by a system, whereby a three-dimensional model closer to a real one can be reproduced.

Further, in the apparatus for reproducing a shape and a pattern in a three-dimensional scene of the present invention, it is preferable that, in the inter-image correspondence obtaining part, the correspondence between the plurality of images is determined based on brightness of the images and information obtained by processing the brightness. This is because merely extracting correspondence as a pattern cannot support a change in an image caused by the difference in exposure of a photograph or the like, the strength of a light source, and the like.

Next, in order to solve the above-mentioned problem, the apparatus for reproducing a shape and a pattern in a three-dimensional scene of the present invention is an apparatus for reproducing a shape and a pattern in a three-dimensional scene forming a three-dimensional model used for computer graphics based on a plurality of images, including: an image input part for capturing the plurality of images; an image storing part for storing the images captured from the image input part; an image selecting part for selecting a plurality of frames to which processing is applied from the images stored in the image storing part; a three-dimensional model input part for inputting the three-dimensional model to be a base; a three-dimensional model storing part for storing the three-dimensional model input from the three-dimensional mode input part; a three-dimensional model selecting part for selecting the three-dimensional model that defines geometric properties of a target object in the images; an image—three-dimensional model correspondence obtaining part for specifying correspondence between the images and the three-dimensional model; a part for simultaneously executing investigation of inter-image correspondence and reproduction of three-dimensional information for deforming the three-dimensional model while investigating portions, between the images, which satisfy the correspondence between the images and the three-dimensional model obtained in the image—three-dimensional model correspondence obtaining part; a pattern image generating part for generating a pattern image to be attached to a surface of the three-dimensional model, based on a shape of the final three-dimensional model obtained in the part for simultaneously executing investigation of inter-image correspondence and reproduction of three-dimensional information, and the specified correspondence between the final three-dimensional model and the images; and a generated model output part for outputting the completed final three-dimensional model.

According to the above-mentioned structure, the shape of a three-dimensional model can be determined while the correspondence in a pattern is being considered, whereby a shape or the like in a three-dimensional scene can be reproduced as a completed natural three-dimensional model in which a pattern shift or the like does not occur.

Further, in the apparatus for reproducing a shape and a pattern in a three-dimensional scene of the present invention, it is desirable that, in the part for simultaneously executing investigation of inter-image correspondence and reproduction of three-dimensional information, and in the pattern image generating part, a user can specify a partial change in geometric properties of the three-dimensional model. The reason for this is that a three-dimensional scene is reproduced as a three-dimensional model closer to a real one by finely adjusting application of a three-dimensional model.

Further, in the apparatus for reproducing a shape and a pattern in a three-dimensional scene of the present invention, it is preferable that, in the part for simultaneously executing investigation of inter-image correspondence and reproduction of three-dimensional information, and in the pattern image generating part, the three-dimensional model can be replaced. This is because a reproduction precision can be enhanced by providing a chance to use a more appropriate three-dimensional model.

Next, in order to solve the above-mentioned problem, the computer-readable recording medium storing a program to be executed by a computer of the present invention is a computer-readable recording medium storing a program to be executed by a computer for creating a three-dimensional model used for computer graphics based on a plurality of images, the program including: capturing the plurality of images; storing the captured images; selecting a plurality of frames to which processing is applied from the stored images; extracting correspondence between the plurality of images; inputting the three-dimensional model to be a base; storing the input three-dimensional model; selecting the three-dimensional model that defines geometric properties of a target object in the images; specifying correspondence between the images and the three-dimensional model; deforming the three-dimensional model while satisfying both the obtained correspondence between the images and the obtained correspondence between the images and the three-dimensional model; generating a pattern image to be attached to a surface of the three-dimensional model, based on a shape of the final three-dimensional model obtained by the deforming, and the specified correspondence between the final three-dimensional model and the images; and outputting the completed final three-dimensional model.

According to the above-mentioned structure, the shape of a three-dimensional model can be determined while the correspondence in a pattern is being considered by loading the program onto a computer for execution, whereby an apparatus for reproducing a shape and a pattern in a three-dimensional scene can be realized, which is capable of reproducing a three-dimensional scene as a completed natural three-dimensional model in which a pattern shift or the like does not occur.

BEST MODE FOR CARRYING OUT THE INVENTION (Embodiment 1)

Figure 1:
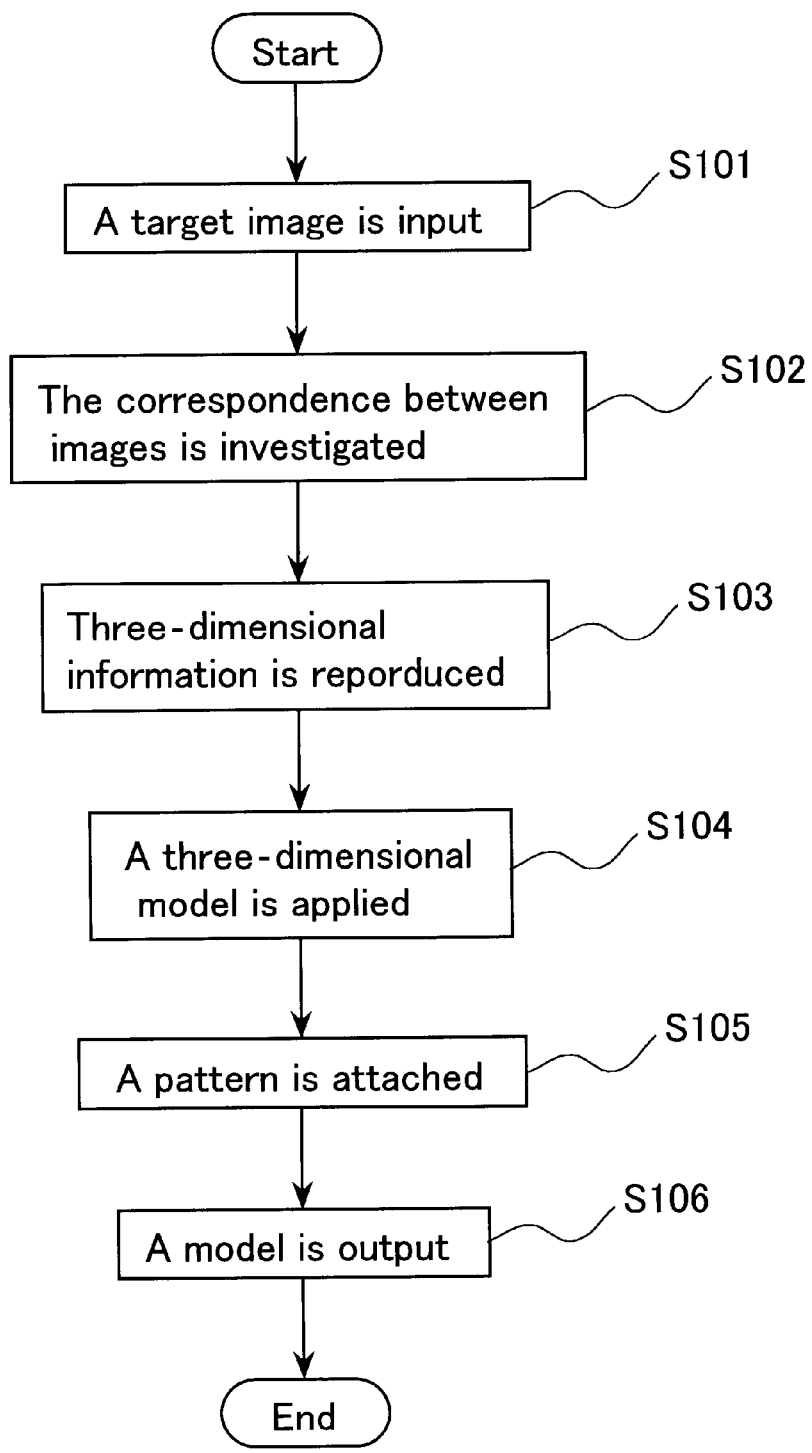
FIG. 1 is a flow chart of processing in a conventional method for reproducing a shape and a pattern in a three-dimensional scene.
Figure 2:
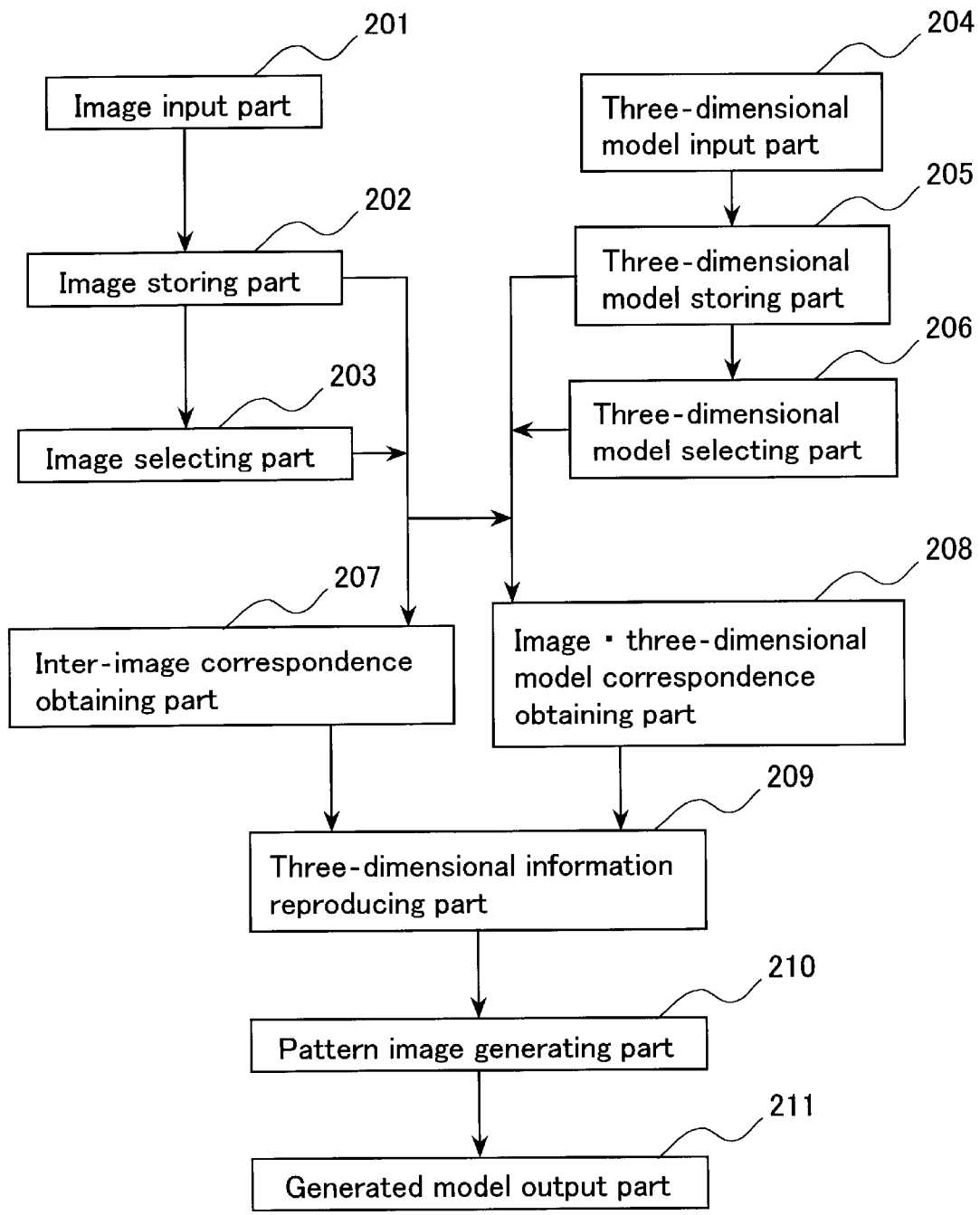
FIG. 2 is a block diagram of an apparatus for reproducing a shape and a pattern in a three-dimensional scene in Embodiment 1 of the present invention.

Hereinafter, an apparatus for reproducing a shape and a pattern in a three-dimensional scene in Embodiment 1 of the present invention will be described with reference to the drawings. FIG. 2 is a block diagram of an apparatus for reproducing a shape and a pattern in a three-dimensional scene in Embodiment 1 of the present invention.

In FIG. 2, reference numeral 201 denotes an image input part, 202 denotes an image storing part, 203 denotes an image selecting part, 204 denotes a three-dimensional model input part, 205 denotes a three-dimensional model storing part, 206 denotes a three-dimensional model selecting part, 207 denotes an inter-image correspondence obtaining part, 208 denotes an image—three-dimensional model correspondence obtaining part, 209 denotes a three-dimensional information reproducing part, 210 denotes a pattern image creating part, and 211 denotes a generated model output part, respectively.

First, in the image input part 201, a plurality of images to be used are captured in the image storing part 202 as a video image or a plurality of still images by using an image input apparatus or the like. Next, in the image selecting part 203, a user selects a plurality of frames to which processing is applied.

On the other hand, in the three-dimensional model input part 204, a three-dimensional model of an object assumed as a target is input, and stored in the three-dimensional model storing part 205. Next, in the three-dimensional model selecting part 206, the user selects a three-dimensional model that best fits the object in the target image from a model group stored in the three-dimensional model storing part 205.

In the inter-image correspondence obtaining part 207, the user specifies portions corresponding to each other between a plurality of images, and in the image—three-dimensional model correspondence obtaining part 208, the user also specifies portions corresponding to each other between each image and the three-dimensional model. For example, this corresponds to that the user specifies the identical position determined based on a pattern, fine-adjusts the positions of vertexes in accordance with the three-dimensional model, and the like.

When each correspondence is determined, in the three-dimensional information reproducing part 209, the three-dimensional model is deformed so as to satisfy the correspondence. Then, the final shape of the three-dimensional model is established, and the final correspondence between the three-dimensional model and each image is also established.

Finally, in the pattern image generating part 210, a pattern image to be attached to each surface of the three-dimensional model is generated based on the final correspondence between the three-dimensional model and each image, and in the generated model output part 211, the pattern image is converted into a data format of a three-dimensional model display system to be output.

Next, an example of the apparatus for reproducing a shape and a pattern in a three-dimensional scene in Embodiment 1 will be described with reference to the drawings.

In FIG. 2, in the image input part 201, an image is input by using a video camera, a CCD camera, or the like. In this case, a video image may be or may not be decomposed into frames. However, in the case where an image is selected in the image selecting part 203, it is required to specify a target frame. Therefore, it is required to provide a function capable of specifying a frame in accordance with user's instruction. Such a function may be equal to a frame-advance display function of a commercially available video deck.

Figure 3:
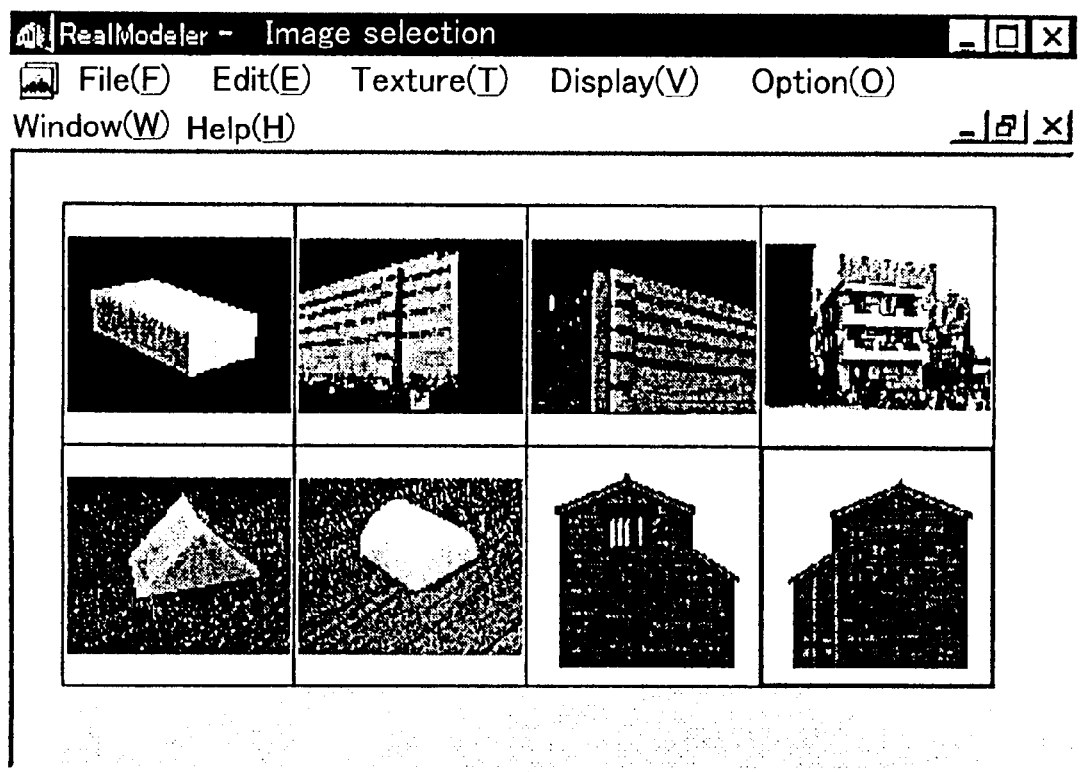
FIG. 3 illustrates an image selection instructing window in one example of the present invention.

FIG. 3 illustrates an image selection specifying window. In the case where there are a plurality of video images and the like, the use of such an interface is useful for a user to select a video image while browsing through them.

Further, as a three-dimensional model that expresses a target object, a rectangular solid, a cone, a cylinder, a sphere, and the like are prepared. The three-dimensional model is not limited thereto. A composite of these shapes may be used.

Further, a three-dimensional model is all expressed in a polygon format. Thus, in the same way as in a data format in conventional computer graphics, a mode is expressed by three-dimensional coordinates in a three-dimensional model coordinate system.

Figure 4:
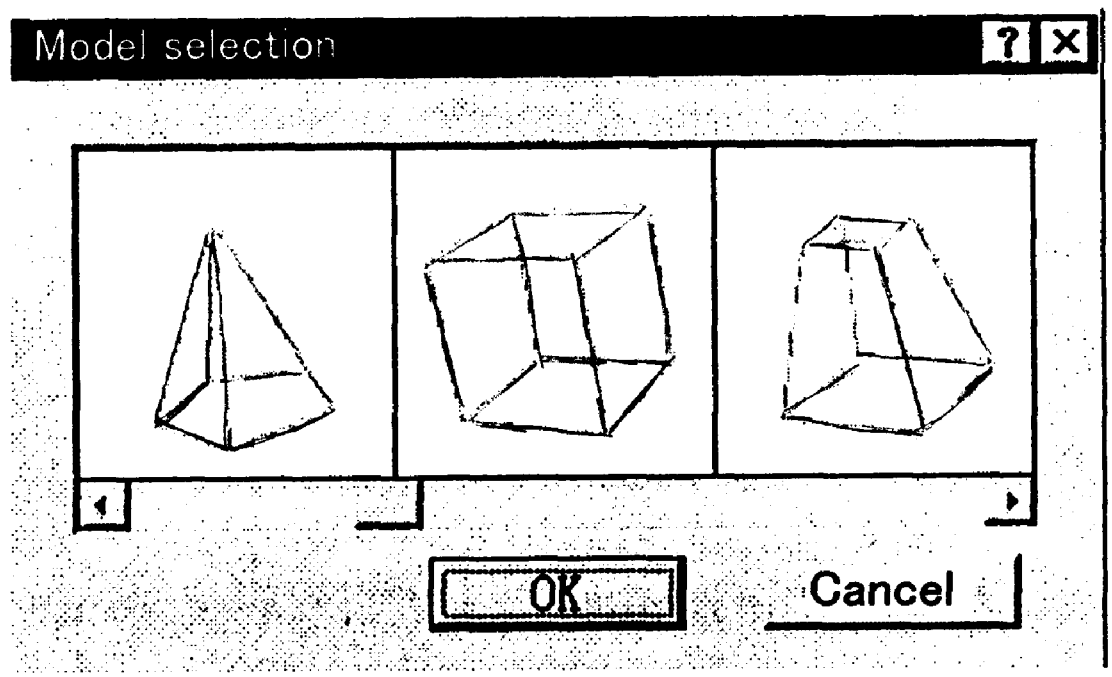
FIG. 4 illustrates a three-dimensional model selection instructing window in one example of the present invention.

For selection of a three-dimensional model, a model selection instructing window as shown in FIG. 4 should be prepared. The reason for this is to enable a user to select the most appropriate model while browsing through the three-dimensional models.

Further, geometric properties of a three-dimensional model are expressed by using a model variation rule. For example, in accordance with a variation rule in which regarding a rectangular solid, each plane can be moved only in a direction vertical to the counter plane, regarding a cylinder, two respective bottom planes can be moved only in a direction vertical to the counter bottom plane, regarding a cone, a unique vertex that does not belong to the bottom plane can be moved only in a direction vertical to the bottom plane, and the like, deformation can be expressed while maintaining geometric properties of a three-dimensional model.

Figure 5:
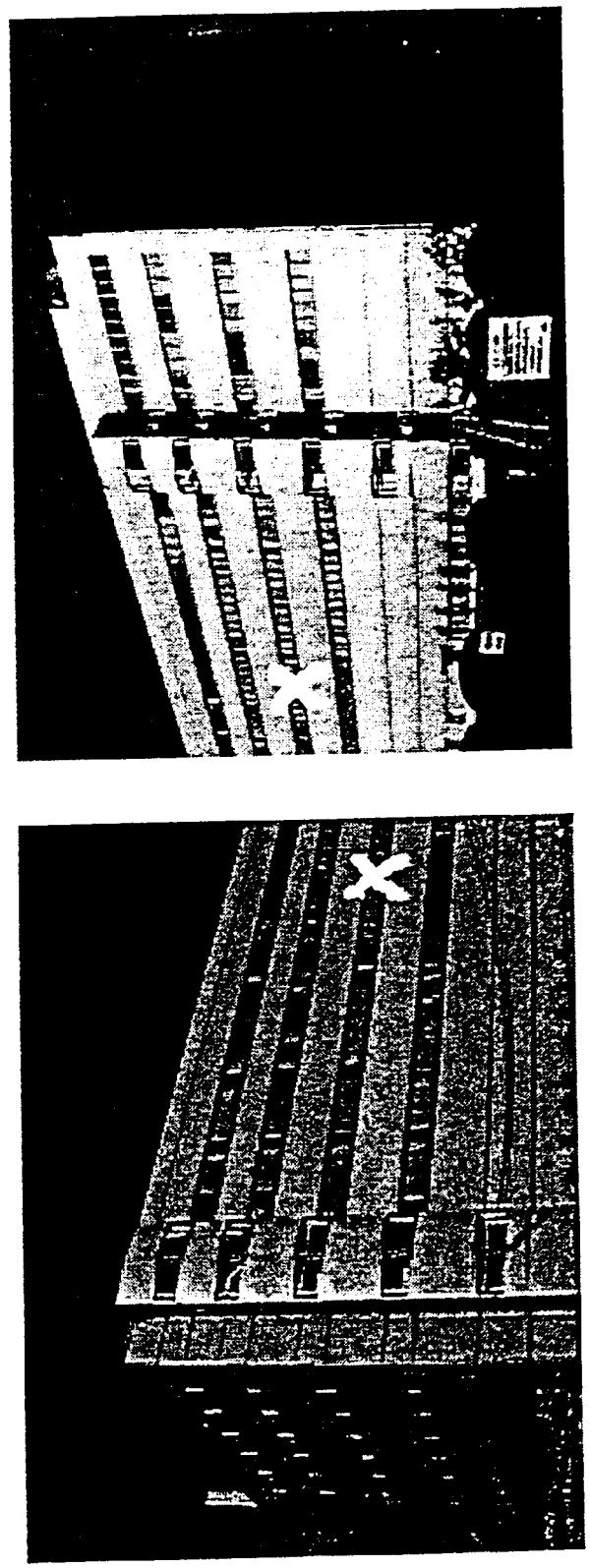
FIG. 5 illustrates the correspondence between images in one example of the present invention.

Next, the correspondence between images will be described with reference to FIG. 5. As shown in FIG. 5, in the case of selecting two images of a building seen at different angles as processing target frames, the correspondence therebetween can be determined when a user specifies the identical portion of two images, using a mouse or the like. For example, in FIG. 5, a white X mark is put in the vicinity of the center of two images, respectively. The correspondence between two images is established by the X mark. The correspondence can easily be specified by an interface such as a mouse. More specifically, the correspondence is composed of an identifier of one image, image coordinates of the corresponding portion on one image, an identifier of the other image, and image coordinates of the corresponding portion on the other image. At least one correspondence should be specified for reproduction of one object. A plurality of correspondences may be specified.

Figure 6:
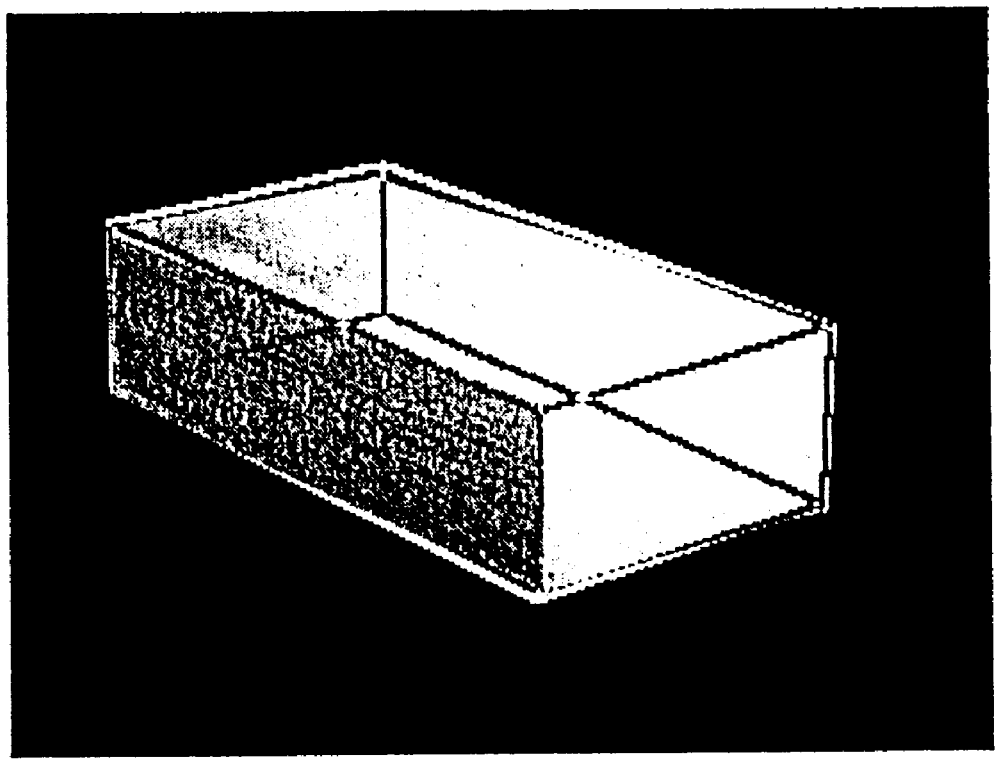
FIG. 6 illustrates the correspondence between the three-dimensional model and the image in one example of the present invention.

Further, based on the correspondence between the image and the three-dimensional model, it is made clear where the three-dimensional model is positioned on each frame. Considering the case where a three-dimensional model is applied to an image exhibiting a simple rectangular solid as shown in FIG. 6, a three-dimensional model is expressed by a wire frame, and the three-dimensional model is deformed so that vertexes correspond to an outline of the object in the target image by dragging a mouse or the like. Finally, as shown in FIG. 6, the outline of the target object in the image should correspond to the wire frame.

Next, a method for determining a three-dimensional model that satisfies both the inter-image correspondence and the correspondence between the image and the three-dimensional model will be described in detail. As a three-dimensional model to be illustrated, a rectangular solid similar to that in FIG. 6 will be considered.

In this case, 8 vertexes can be expressed by (0, 0, 0), (1, 0, 0), (0, h, 0), (1, h, 0), (0, 0, d), (1, 0, d), (0, h, d), and (1, h, d) in a three-dimensional coordinate system, respectively. Herein, h and d are variables, h represents a height, and d represents a depth. By determining h and d, the shape of a target object can be determined as an entity of a rectangular solid model.

Similarly, in the case of a regular n-angular prism, vertexes can be expressed by (cos ($2\pi i/n$), sin ($2\pi i/n$), 0), (cos ($2\pi i/n$), sin ($2\pi i/n$), d) (i is an integer, i=0, . . . , n−1). In the case of a regular n-pyramid, vertexes can be expressed by (cos ($2\pi i/n$), sin ($2\pi i/n$), 0) (i is an integer, i=0, . . . , n−1), (0, 0, d). In any case, if a variable d is determined, the shape of a target object can be determined as an entity of a three-dimensional model. Regarding the other three-dimensional models, parameters similar to d and h are prepared, whereby the shape of a target object can be determined as an entity of a three-dimensional model.

The above-mentioned vertex has a vertex number for identifying each vertex. Each plane of a model can be expressed by a graph of vertex numbers. In a model of a rectangular solid, if a vertex number is provided to each vertex as follows: 0:(0, 0, 0), 1:(1, 0, 0), 2:(0, h, 0), 3:(1, h, 0), 4: (0, 0, d), 5:(1, 0, d), 6: 0, h, d), 7:(1, h, d), each plane is composed of four vertexes. Therefore, each plane can be expressed by being assigned a plane number as follows: 0: 0-1-3-2, 1:4-5-7-6, 2:0-1-5-4, 3:2-3-7-6, 4:0-2-6-4, and 5:1-3-7-5.

In order to specify the correspondence between each image and the three-dimensional model, it is required to project a three-dimensional model onto an image by perspective projection. Since there are a plurality of basic images, a frame number is provided to each image, and a variable representing the perspective projection process is determined while adjusting the above-mentioned variables h and d, whereby a solution satisfying the correspondence between each image and the three-dimensional model can be obtained.

When the perspective projection process is expressed by a mathematical expression, vertexes (x, y, z) of a three-dimensional model are projected onto points (r, c) on an image as expressed by Equation 1.

$$\binom{r}{c} = \begin{pmatrix} f\frac{Y}{Z} \\ f\frac{X}{Z} \end{pmatrix}, \begin{pmatrix} X \\ Y \\ Z \end{pmatrix} = A\begin{pmatrix} x \\ y \\ z \end{pmatrix} + O \quad (1)$$

Where r and c are a row number and a column number of an image, respectively, A is a rotating matrix of 3×3, and O is an origin vector representing movement on a screen. Thus, a rotation matrix is expressed by three rotation angles and the order of the origin vector is 3; therefore, it is clear that r and c are composed of three variables. Further, f represents a focal length.

Further, in order to express the correspondence between images, it should be considered that coordinates on a three-dimensional model of the corresponding point are (x, y, z), and a projection position based on a projection equation represented by Equation 1 becomes a specified coordinate.

More specifically, in the case where there are p correspondences, the q-th (q=0, . . . ,p−1) correspondence is composed of the following elements. That is, the q-th correspondence is composed of coordinates ($x_q$, $y_q$, $z_q$) of an arbitrary point in a three-dimensional model coordinate system, a plane number $S_q$ of a plane on which the point is present, one frame number $I_{q,1}$ at which the point is observed, a projection position ($r_{q,1}$, $c_{q,1}$) in the image, the other frame number $i_{q,2}$, $c_{1,2}$ at which the point is observed, and a projection position ($r_{q,2}$, $c_{q,2}$) in the image. Among them, ($x_q$, $y_q$, $z_q$) is an unknown number, so that one set of correspondence has three unknown numbers.

From the above-mentioned consideration, unknown numbers are as follows: shape parameters h and d of a model or a shape parameter d of a model, a focal length $f_i$ (i=0, . . . , n−1) of n frames, a rotating matrix $A_1$(i=0, . . . , n−1), an origin vector $O_i$ (i=0, . . . , n−1), and correspondence coordinates of p correspondences ($x_q$, $y_q$, $z_q$) (q=0, . . . , p−1). Thus, the number of unknown numbers becomes 2+7n+3p or 1+7n+3p.

In contrast, conditions to be given are as follows: specifically, in the case where a model is composed of m vertexes, coordinates ($r_{ij}$, $c_{ij}$) (i=0, . . . , n−1, j=0, . . . , m−1) of an image in which each vertex $P_j$=($x_j$, $y_j$, $z_j$) (j=0, . . . , m−1) of a model is seen on an i-th frame, a plane number $S_q$ having a point ($x_q$, $y_q$, $z_q$) at which the correspondence is given with respect to a q-th (q=0, . . . , p−1 ) correspondence, one frame number $I_{q,1}$, a projection position ($r_{q,1}$, $c_{q,1}$) on the frame, and the other frame number $i_{q,2}$ and a projection position ($r_{q,2}$, $c_{q,2}$) on the frame.

Thus, assuming that a conversion equation in which the point (x, y, z) in a three-dimensional model coordinate system is projected to the i-th frame is expressed as F (x, y, z; $f_i$, $A_i$, $O_i$) by using the focal length $f_i$, the rotating matrix $A_i$, and the origin vector $O_i$, Simultaneous Equations 2 hold.

$$F(x_j, y_j, z_j; f_1, A_1, O_1) = (r_y, c_y)(i=0, \ldots, n-1, j=0, \ldots, m-1)$$

$$F(x_k, y_k, z_k; f_{1h,1}, A_{1h,1}, O_{1k,1}) = (r_{k,1}, c_{k,1})(k=0, \ldots, l-1),$$

$$F(x_k, y_k, z_k; f_{1h\,2}, A_{1h,2}, O_{1h\,2}) = (r_{k,2}, c_{k,2})(k=0, \ldots, l-1) \quad (2)$$

Further, as restricting conditions, assuming that an equation of an S-th plane is expressed as S (x, y, z; s), Equation 3 holds.

$$S(x_k, y_k, z_k; s_k) = 0 (k=0, \ldots, l-1) \quad (3)$$

By solving the above-mentioned equations, shape parameters of the three-dimensional model can be determined, and incidentally, a projection equation of a three-dimensional mode to an image frame, and coordinates of the corresponding point can be obtained.

The above-mentioned simultaneous equations can be solved in the case where the number of these equations is equal to or larger than the number of variables. A solution is not particularly limited. A general method of least squares may be used, or various methods such as maximum likelihood estimation, Levenberg-Marquart method, and robust estimation may be used.

Figure 8:
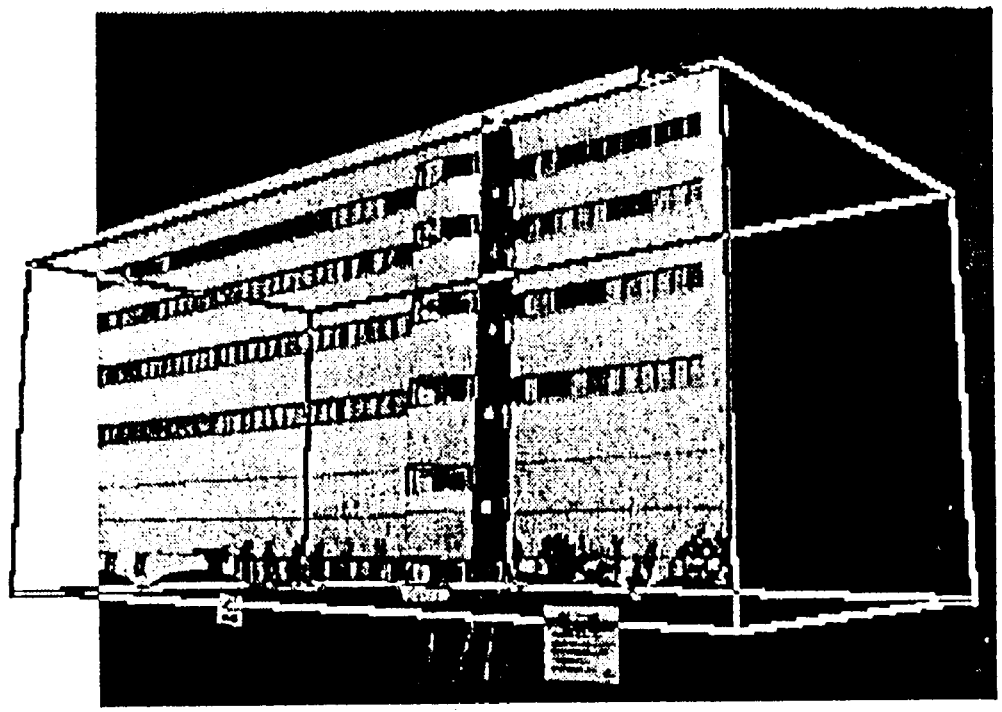
FIG. 8 illustrates the correspondence between the reproduced three-dimensional model and the image in one example of the present invention.
Figure 9:
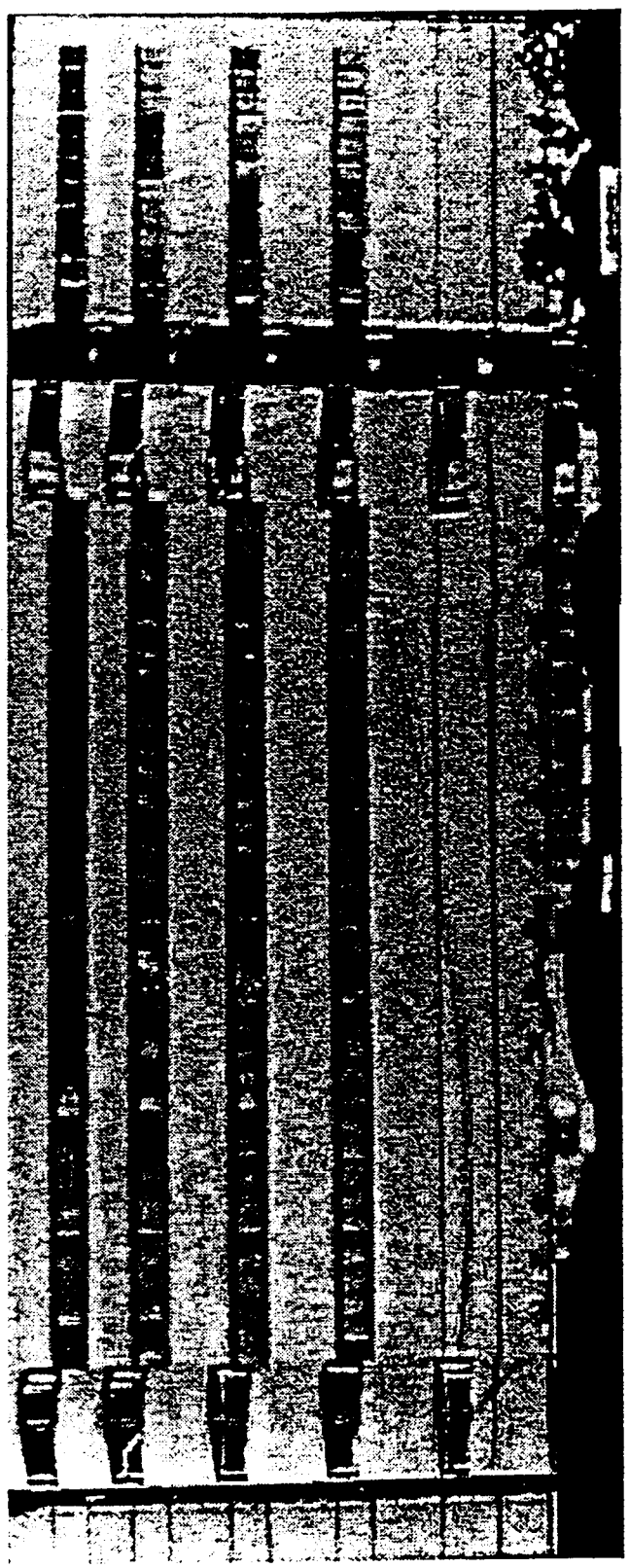
FIG. 9 illustrates a reproduced three-dimensional mode in one example of the present invention.

When the three-dimensional model is determined in the above-mentioned procedure, a pattern image is obtained based on the correspondence between the final three-dimensional model and the image. FIG. 9 shows an example of a generated pattern image in the case where the final three-dimensional model is determined as represented by white lines in FIGS. 7 and 8.

Figure 7:
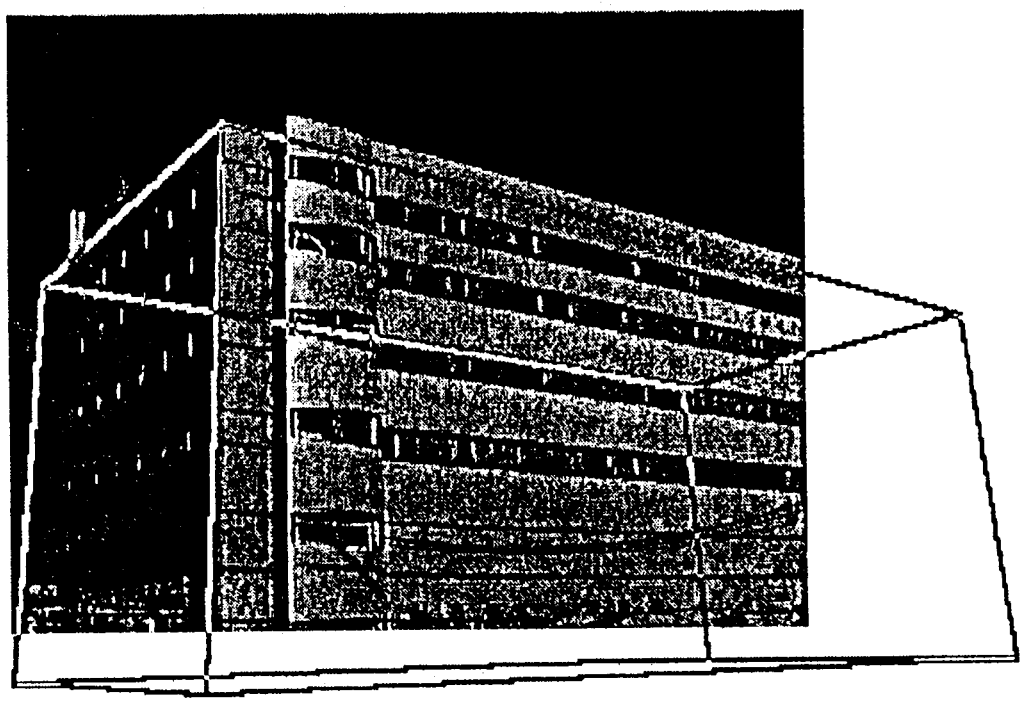
FIG. 7 illustrates the correspondence between the reproduced three-dimensional model and the image in one example of the present invention.

The pattern of a three-dimensional model is obtained by converting given image information to an image in the case where each plane of the three-dimensional model is observed from a front side. In the case where an partial image is seen in a plurality of frames as shown in FIGS. 7 and 8, a pattern image as shown in FIG. 9 should be generated as an overlapping image of each front side of the frames. A conversion equation of such image information can be derived from parameters representing a projection process and projection geometry.

Information regarding the three-dimensional model thus obtained is composed of coordinates of each vertex of the three-dimensional model, a graph of vertexes forming sides and planes, and a pattern image attached to each plane. Such information should be output in accordance with the existing format such as VRML (Virtual Reality Modeling Language).

As described above, in Embodiment 1, the shape of a three-dimensional model can be determined while the correspondence of a pattern is also taken into consideration, and the shape and the like in a three-dimensional scene can be reproduced as a natural three-dimensional model in which a shift and the like of a pattern does not occur in the completed three-dimensional model.

Embodiment 2

Embodiment 2 of the present invention will be described with reference to the drawings.

Figure 10:
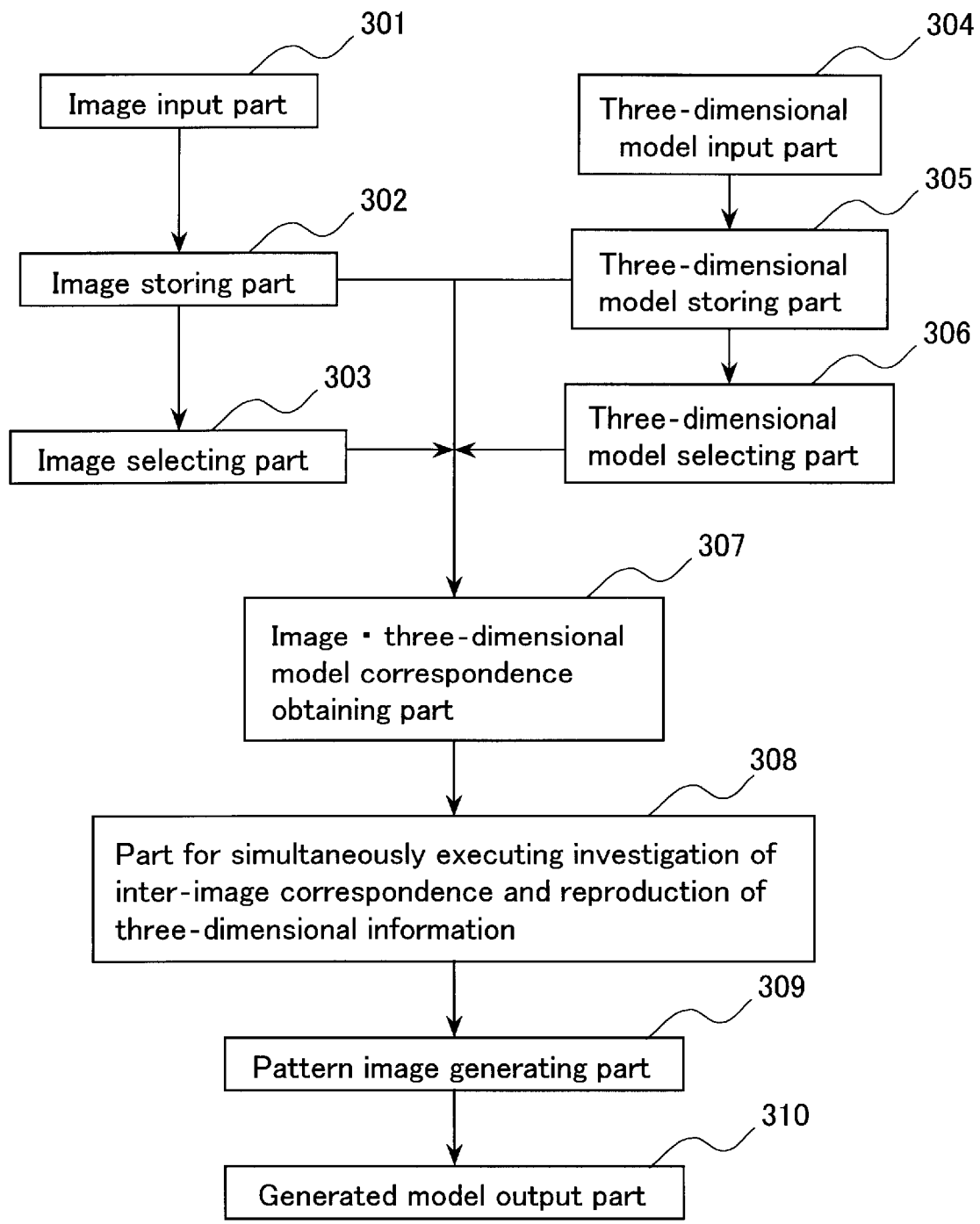
FIG. 10 is a block diagram of an apparatus for reproducing a shape and a pattern in a three-dimensional scene in Embodiment 2 of the present invention.

FIG. 10 is a block diagram of an apparatus for reproducing a shape and a pattern in a three-dimensional scene in Embodiment 2 of the present invention. In FIG. 10, reference numeral 301 denotes an image input part, 302 denotes an image storing part, 303 denotes an image selecting part, 304 denotes a three-dimensional model input part, 305 denotes a three-dimensional model storing part, 306 denotes a three-dimensional model selecting part, 307 denotes an image—three-dimensional model correspondence obtaining part, 308 denotes a part for simultaneously executing investigation of inter-image correspondence and reproduction of three-dimensional information, 309 denotes a pattern image creating part, and 310 denotes a generated model output part, respectively.

FIG. 10 is different from FIG. 2 that is a block diagram of an apparatus for reproducing a shape and a pattern in a three-dimensional scene in Embodiment 1 of the present invention, mainly in a method for obtaining the correspondence between images and between the image and the three-dimensional model.

In FIG. 10, first, in the same way as in FIG. 2, in the image input part 301, a plurality of images to be used are captured in the image storing part 302 as a video image or a plurality of still images by using an image input apparatus or the like. Next, in the image selecting part 303, a user selects a plurality of frames to which processing is applied.

On the other hand, in the three-dimensional model input part 304, a three-dimensional model of an object assumed as a target is input, and stored in the three-dimensional model storing part 305. Next, in the three-dimensional model selecting part 306, the user selects a three-dimensional model that best fits the object in the target image from a model group stored in the three-dimensional model storing part 305.

In the image—three-dimensional model correspondence obtaining part 307, the user specifies portions corresponding to each other between the selected respective images and the three-dimensional model. For example, this corresponds to that the user specifies the identical position determined based on a pattern, fine-adjusts the position of a vertex in accordance with the three-dimensional model, and the like.

When the correspondence between each image and the three-dimensional model is determined, in the part for simultaneously executing investigation of inter-image correspondence and reproduction of three-dimensional information 308, the three-dimensional model is deformed so as to satisfy the correspondence between each image and the three-dimensional model while investigating portions corresponding to each other between the respective images. Then, the final shape of the three-dimensional model is established, and the final correspondence between the three-dimensional model and the image is also established.

Finally, in the pattern image generating part 309, a pattern image to be attached to each surface of the three-dimensional model is generated based on the final correspondence between the three-dimensional model and the image, and in the generated model output part 310, the pattern image is converted into a data format of a three-dimensional model display system to be output.

As described above, regarding a method for determining a three-dimensional model in the case where investigation of the correspondence between the images and reproduction of three-dimensional information are simultaneously executed, the correspondence shown in Embodiment 1 is not used, but a condition that pattern information with respect to the identical portion in the three-dimensional model is equal between frames should be mathematically expressed and added to simultaneous equations described in Embodiment 1.

For example, it is assumed that an arbitrary point (x, y, z) on a three-dimensional model can be expressed by a three-dimensional vector function C (x, y, z; $a_i$) on an i-th frame. Herein, $a_i$ is a parameter vector that changes a color of a three-dimensional model to a color seen in the i-th frame, which implies adjustment or the like in the case where the brightness is changed by adjustment or the like of a camera diaphragm when each frame is shot.

In the case where a point ($r_i$, $c_i$) in the i-th ($0 \leq i \leq n-1$) frame is present on a plane s, coordinates (x, y, z) on the three-dimensional model can be obtained by solving Simultaneous Equations 4.

$$\begin{cases} \begin{pmatrix} r_i \\ c_i \end{pmatrix} = \begin{pmatrix} f_i \frac{Y}{Z} \\ f_i \frac{X}{Z} \end{pmatrix}, \\ \begin{pmatrix} X \\ Y \\ Z \end{pmatrix} = A_i \begin{pmatrix} x \\ y \\ z \end{pmatrix} + O_i, \\ S(x, y, z; s) = 0 \end{cases} \quad (4)$$

Further, an image is projected onto a point ($r_j$, $c_j$) that satisfies Simultaneous Equations 5 in a j-th ($j \neq i$, $0 \leq j \leq n-1$) frame.

$$\begin{cases} \begin{pmatrix} r_j \\ c_j \end{pmatrix} = \begin{pmatrix} f_j \frac{Y}{Z} \\ f_j \frac{X}{Z} \end{pmatrix}, \\ \begin{pmatrix} X \\ Y \\ Z \end{pmatrix} = A_j \begin{pmatrix} x \\ y \\ z \end{pmatrix} + O_j, \end{cases} \quad (5)$$

Where, it is assumed that a color in the i-th frame (r, c) is expressed by a vector $I_i$ (r, c), a matching condition of the previous pattern can be expressed by $I_i$ ($r_i$, $c_i$)=C (x, y, z; $a_i$), $I_j$ ($r_j$, $c_j$)=C (x, y, z; $a_j$). By setting these equations with respect to all the points in a range contained in a three-dimensional model on a screen, simultaneous equations can be formulated. Then, by solving these simultaneous equations simultaneously with Simultaneous Equations 2, the following unknown numbers of a three-dimensional model and a projection can be obtained without determining the correspondence between the respective images.

Specifically, the unknown numbers are shape parameters h and d of a model or a shape parameter d of a model, a focal length $f_i$ (i=0, . . . , n-1) of n frames, a rotating matrix $A_i$ (i=0, . . . , n-1), and an origin vector $O_i$ (i=0, . . . , n-1).

In order to solve these simultaneous equations, it is required that, among the equations, the number of equations regarding a pattern matching condition is larger than n times of the order of $a_i$. A solution is not particularly limited. A general method of least squares may be used, or various methods such as maximum likelihood estimation, Levenberg-Marquart method and robust estimation may be used.

As described above, in Embodiment 2, in order to determined the shape of a three-dimensional model, the correspondence of a pattern is not required to be determined previously. A three-dimensional model is determined while considering the shape of a three-dimensional model at a time of reproduction of the three-dimensional model. Thus, the shape and the like in a three-dimensional scene can be reproduced as a natural three-dimensional model in which a shift or the like of a pattern does not occur in the completed three-dimensional model.

Figure 11:
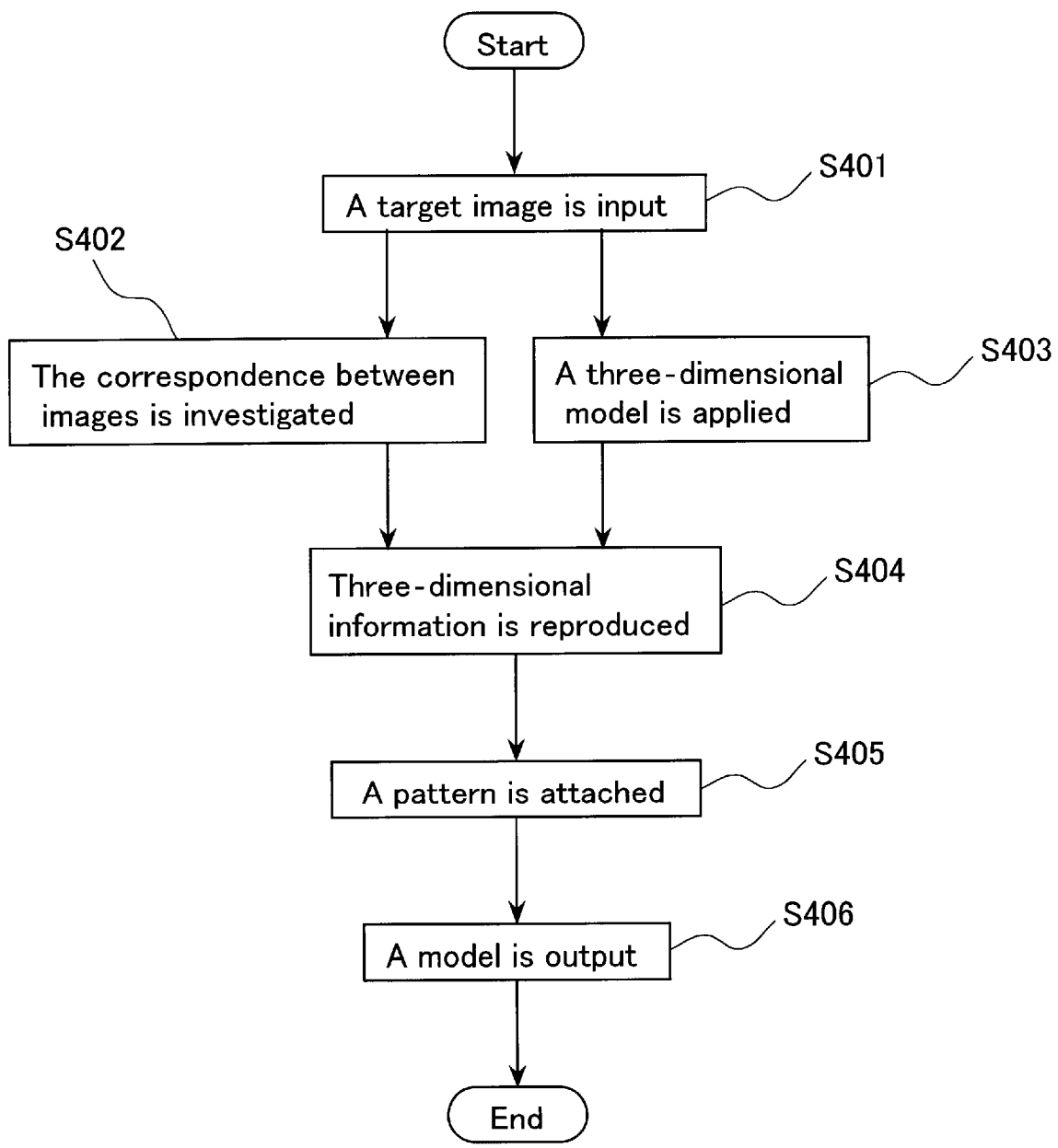
FIG. 11 is a flow chart of processing in an apparatus for reproducing a shape and a pattern in a three-dimensional scene in Embodiment 1 of the present invention.

Next, processing operations of a program of realizing an apparatus for reproducing a shape and a pattern in a three-dimensional scene in Embodiment 1 of the present invention will be described. FIG. 11 is a flow chart illustrating processing of a program for realizing an apparatus for reproducing a shape and a pattern in a three-dimensional scene in Embodiment 1 of the present invention.

Referring to FIG. 11, a plurality of target images are input (Operation 401). Thereafter, the correspondence between a plurality of images is investigated on one hand (Operation 402), and an appropriate three-dimensional model is applied so as to determine the correspondence between each image and the three-dimensional model on the other hand (Operation 403). When each correspondence is determined, the three-dimensional model is deformed while satisfying the correspondence to reproduce three-dimensional information (Operation 404). Finally, a pattern image is attached to each surface of a three-dimensional model based on each correspondence (Operation 405), and a three-dimensional model is output (Operation 406).

Figure 12:
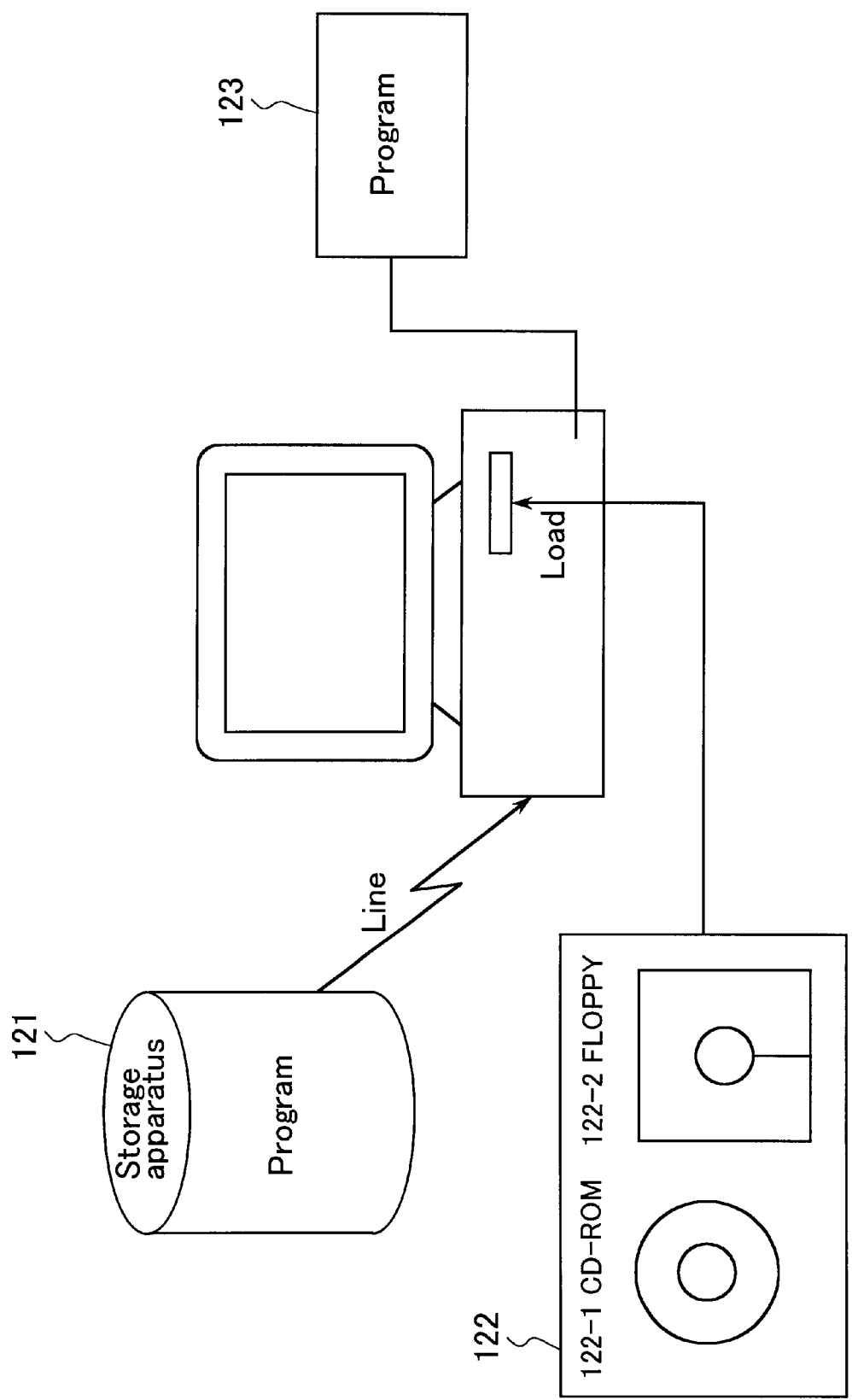
FIG. 12 illustrates recording media.

Examples of a recording medium storing a program for realizing an apparatus for reproducing a shape and a pattern in a three-dimensional scene in Embodiment 1 of the present invention include a storage apparatus 121 provided at the end of a communication line and a recording medium 123 such as a hard disk and a RAM of a computer, as well as a portable recording medium 122 such as a CD-ROM 122-1 and a floppy disk 122-2, as illustrated by examples of recording media in FIG. 12. In execution, the program is loaded and executed on a main memory.

Further, examples of a recording medium storing three-dimensional model data generated by an apparatus for reproducing a shape and a pattern in a three-dimensional scene in Embodiment 1 of the present invention include a storage apparatus 121 provided at the end of a communication line and a recording medium 123 such as a hard disk and a RAM of a computer, as well as a portable recording medium 122 such as a CD-ROM 122-1 and a floppy disk 122-2, as illustrated by examples of recording media in FIG. 12. For example, the recording medium is read by a computer when an apparatus for reproducing a shape and a pattern in a three-dimensional scene of the present invention is used.

INDUSTRIAL APPLICABILITY

As described above, according to the method and apparatus for reproducing a shape and a pattern in a three-dimensional scene of the present invention, the shape of a three-dimensional model can be deformed while the consistency of a pattern on the surface of the three-dimensional model is being taken into consideration. Therefore, it becomes possible to reproduce a three-dimensional model that is close to an entity of a three-dimensional scene.

What is claimed is:

1. A method for reproducing a shape and a pattern in a three-dimensional scene forming a three-dimensional model used for computer graphics based on a plurality of images, comprising:

capturing the plurality of images, storing the captured images, selecting a plurality of frames to which processing is applied from the stored images, and extracting correspondence between the plurality of images;

inputting the three-dimensional model to be a base, storing the input three-dimensional model, selecting the three-dimensional model that defines geometric properties of a target object in the images, and specifying correspondence between the images and the three-dimensional model;

deforming the three-dimensional model while satisfying both the obtained correspondence between the images and the obtained correspondence between the images and the three-dimensional model;

generating a pattern image to be attached to a surface of the three-dimensional model, based on a shape of the final three-dimensional model obtained by the deforming, and the specified correspondence between the final three-dimensional model and the images; and outputting the completed final three-dimensional model.

2. A method for reproducing a shape and a pattern in a three-dimensional scene according to claim 1, wherein, in the extracting of the correspondence between the plurality of images, a user can specify the correspondence.

3. A method for reproducing a shape and a pattern in a three-dimensional scene according to claim 1, wherein, in the extracting of the correspondence between the plurality of images, the correspondence between the plurality of images is determined based on brightness of the images and information obtained by processing the brightness.

4. A method for reproducing a shape and a pattern in a three-dimensional scene according to claim 1, wherein, in the deforming of the three-dimensional model and in the generating of a pattern image to a surface of the three-dimensional model, a user can specify a partial change in geometric properties of the three-dimensional model.

5. A method for reproducing a shape and a pattern in a three-dimensional scene according to claim 1, wherein, in the deforming of the three-dimensional model and in the generating of a pattern image to a surface of the three-dimensional model, the three-dimensional model can be replaced.

6. A method for reproducing a shape and a pattern in a three-dimensional scene forming a three-dimensional model used for computer graphics based on a plurality of images, comprising:

capturing the plurality of images, storing the captured images, and selecting a plurality of frames to which processing is applied from the stored images;

inputting the three-dimensional model to be a base, storing the input three-dimensional model, selecting the three-dimensional model that defines geometric properties of a target object in the images, and specifying correspondence between the images and the three-dimensional model;

deforming the three-dimensional model while investigating portions, between the images, which satisfy the obtained correspondence between the images and the three-dimensional model;

generating a pattern image to be attached to a surface of the three-dimensional model, based on a shape of the final three-dimensional model obtained by the deforming, and the specified correspondence between the final three-dimensional model and the images; and outputting the completed final three-dimensional model.

7. A method for reproducing a shape and a pattern in a three-dimensional scene according to claim 6, wherein, in the deforming of the three-dimensional model and in the generating of a pattern image to a surface of the three-dimensional model, a user can specify a partial change in geometric properties of the three-dimensional model.

8. A method for reproducing a shape and a pattern in a three-dimensional scene according to claim 6, wherein, in the deforming of the three-dimensional model and in the generating of a pattern image to a surface of the three-dimensional model, the three-dimensional model can be replaced.

9. An apparatus for reproducing a shape and a pattern in a three-dimensional scene forming a three-dimensional model used for computer graphics based on a plurality of images, comprising:

an image input part for capturing the plurality of images;

an image storing part for storing the images captured from the image input part;

an image selecting part for selecting a plurality of frames to which processing is applied from the images stored in the image storing part;

an inter-image correspondence obtaining part for extracting correspondence between the plurality of images;

a three-dimensional model input part for inputting the three-dimensional model to be a base;

a three-dimensional model storing part for storing the three-dimensional model input from the three-dimensional mode input part;

a three-dimensional model selecting part for selecting the three-dimensional model that defines geometric properties of a target object in the images;

an image—three-dimensional model correspondence obtaining part for specifying correspondence between the images and the three-dimensional model;

a three-dimensional information reproducing part for deforming the three-dimensional model while satisfying both the correspondence between the images obtained in the inter-image correspondence obtaining part and the correspondence between the images and the three-dimensional model obtained in the image—three-dimensional model correspondence obtaining part;

a pattern image generating part for generating a pattern image to be attached to a surface of the three-dimensional model, based on a shape of the final three-dimensional model obtained in the three-dimensional information reproducing part, and the specified correspondence between the final three-dimensional model and the images; and a generated model output part for outputting the completed final three-dimensional model.

10. An apparatus for reproducing a shape and a pattern in a three-dimensional scene according to claim 9, wherein, in the inter-image correspondence obtaining part, a user can specify the correspondence.

11. An apparatus for reproducing a shape and a pattern in a three-dimensional scene according to claim 9, wherein, in the inter-image correspondence obtaining part, the correspondence between the plurality of images is determined based on brightness of the images and information obtained by processing the brightness.

12. An apparatus for reproducing a shape and a pattern in a three-dimensional scene according to claim 9, wherein, in the part for simultaneously executing investigation of inter-image correspondence and reproduction of three-dimensional information, and in the pattern image generating part, a user can specify a partial change in geometric properties of the three-dimensional model.

13. An apparatus for reproducing a shape and a pattern in a three-dimensional scene according to claim 9, wherein, in the part for simultaneously executing investigation of inter-image correspondence and reproduction of three-dimensional information, and in the pattern image generating part, the three-dimensional model can be replaced.

14. An apparatus for reproducing a shape and a pattern in a three-dimensional scene forming a three-dimensional model used for computer graphics based on a plurality of images, comprising:

an image input part for capturing the plurality of images;

an image storing part for storing the images captured from the image input part;

an image selecting part for selecting a plurality of frames to which processing is applied from the images stored in the image storing part;

a three-dimensional model input part for inputting the three-dimensional model to be a base;

a three-dimensional model storing part for storing the three-dimensional model input from the three-dimensional mode input part;

a three-dimensional model selecting part for selecting the three-dimensional model that defines geometric properties of a target object in the images;

an image—three-dimensional model correspondence obtaining part for specifying correspondence between the images and the three-dimensional model;

a part for simultaneously executing investigation of inter-image correspondence and reproduction of three-dimensional information for deforming the three-dimensional model while investigating portions, between the images, which satisfy the correspondence between the images and the three-dimensional model obtained in the image—three-dimensional model correspondence obtaining part;

a pattern image generating part for generating a pattern image to be attached to a surface of the three-dimensional model, based on a shape of the final three-dimensional model obtained in the part for simultaneously executing investigation of inter-image correspondence and reproduction of three-dimensional information, and the specified correspondence between the final three-dimensional model and the images; and a generated model output part for outputting the completed final three-dimensional model.

15. An apparatus for reproducing a shape and a pattern in a three-dimensional scene according to claim 14, wherein, in the part for simultaneously executing investigation of inter-image correspondence and reproduction of three-dimensional information, and in the pattern image generating part, a user can specify a partial change in geometric properties of the three-dimensional model.

16. An apparatus for reproducing a shape and a pattern in a three-dimensional scene according to claim 14, wherein, in the part for simultaneously executing investigation of inter-image correspondence and reproduction of three-dimensional information, and in the pattern image generating part, the three-dimensional model can be replaced.

17. A computer-readable recording medium storing a program to be executed by a computer for creating a three-dimensional model used for computer graphics based on a plurality of images, the program comprising:

capturing the plurality of images;

storing the captured images;

selecting a plurality of frames to which processing is applied from the stored images;

extracting correspondence between the plurality of images;

inputting the three-dimensional model to be a base;

storing the input three-dimensional model;

selecting the three-dimensional model that defines geometric properties of a target object in the images;

specifying correspondence between the images and the three-dimensional model;

deforming the three-dimensional model while satisfying both the obtained correspondence between the images and the obtained correspondence between the images and the three-dimensional model;

generating a pattern image to be attached to a surface of the three-dimensional model, based on a shape of the final three-dimensional model obtained by the deforming, and the specified correspondence between the final three-dimensional model and the images; and outputting the completed final three-dimensional model.

* * * * *